United States Patent
Chang (10) Patent No.: US 8,118,464 B2
(45) Date of Patent: Feb. 21, 2012

(54) LIGHT GUIDE PLATE AND BACKLIGHT MODULE

(75) Inventor: Liang-Kang Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 500 days.

(21) Appl. No.: 12/484,251

(22) Filed: Jun. 15, 2009

(65) Prior Publication Data

US 2010/0110725 A1 May 6, 2010

(30) Foreign Application Priority Data

Oct. 30, 2008 (TW) .............................. 97141844 A (51) Int. Cl.
*F21V 7/04* (2006.01)

(52) U.S. Cl. ...... 362/608; 362/97.1; 362/97.2; 362/618; 362/620

(58) Field of Classification Search .......... 362/600–632, 362/97.1–97.4
See application file for complete search history.

(56) References Cited

U.S. PATENT DOCUMENTS

| | | | | |
|---|---|---|---|---|
| 6,425,673 | B1 * | 7/2002 | Suga et al. ..................... | 362/613 |
| 6,700,632 | B2 * | 3/2004 | Taniguchi et al. .............. | 349/65 |
| 6,837,588 | B2 * | 1/2005 | Kunimochi et al. ........... | 362/617 |
| 7,160,016 | B2 * | 1/2007 | Yu et al. ......................... | 362/620 |
| 7,322,733 | B2 | 1/2008 | Chang et al. | |
| 7,325,959 | B2 | 2/2008 | Tsai | |
| 7,342,618 | B2 * | 3/2008 | Kim ................................ | 349/65 |
| 7,703,973 | B2 * | 4/2010 | Zhu et al. ....................... | 362/623 |
| 8,047,669 | B2 * | 11/2011 | Bourdelais et al. ........... | 362/97.3 |
| 2007/0041216 | A1 * | 2/2007 | Yue ................................ | 362/620 |
| 2010/0103700 | A1 * | 4/2010 | Tsang ........................... | 362/618 |
| 2010/0259950 | A1 * | 10/2010 | Chen et al. .................... | 362/619 |
| 2011/0090713 | A1 * | 4/2011 | Chen et al. .................... | 362/612 |

FOREIGN PATENT DOCUMENTS

| | | |
|---|---|---|
| TW | 00573135 | 1/2004 |
| TW | I247142 | 1/2006 |
| TW | 200624715 | 7/2006 |
| TW | 200627012 | 8/2006 |
| TW | I282021 | 6/2007 |
| TW | I287152 | 9/2007 |

* cited by examiner

*Primary Examiner* — Anabel Ton
(74) *Attorney, Agent, or Firm* — Jianq Chyun IP Office (57) ABSTRACT

A light guide plate (LGP) including a first surface, a second surface, a light incident surface and a plurality of optical micro-structures is provided. The first surface is opposite to the second surface. The light incident surface connects the first surface and the second surface. The optical micro-structures are disposed on the second surface and include a plurality of round protrusive points and a plurality of curved protrusions. The curved protrusions are disposed among the round protrusive points. Each of the curved protrusions has a first arc side and a second arc side opposite to the first arc side, and an indentation of the first arc side and an indentation of the second arc side are substantially towards a same direction. In addition, a backlight module employing the above-mentioned LGP is also provided.

20 Claims, 8 Drawing Sheets

LIGHT GUIDE PLATE AND BACKLIGHT MODULE

CROSS-REFERENCE TO RELATED APPLICATION

This application claims the priority benefit of Taiwan application serial no. 97141844, filed on Oct. 30, 2008. The entirety of the above-mentioned patent application is hereby incorporated by reference herein and made a part of specification.

BACKGROUND OF THE INVENTION

1. Field of the Invention

The invention generally relates to an optical component and a light source module, and more particularly, to a light guide plate (LGP) and a backlight module.

2. Description of Related Art

Along with the flourishing developments of flat panel display (FPD) technology, liquid crystal displays (LCDs) have played a major role in the mainstream display market and are widely used in people's daily lives to replace the traditional cathode ray tube (CRT) display. Since an LCD panel may not be self-luminescent, a backlight module is employed to provide a backlight source. According to the disposing position of the light-emitting devices in a backlight module, the backlight module is categorized into a direct type backlight module and a side type backlight module, wherein the side type backlight module is able to guide light from a side to the front thereof to form a surface light source by employing an LGP serving as the critical component.

In a side type backlight module where light emitting diodes (LEDs) are used as the light-emitting devices, a plurality of LEDs are arranged beside the light incident surface of the LGP. The light beams emitted from the LEDs have directionality, i.e., the divergent angle thereof is limited and certain. As a result, when the light beams from the LEDs enter the LGP through the light incident surface, dim regions with a luminance lower than other areas and bright regions with a luminance higher than other areas are formed. The above-mentioned bright regions are usually termed as hot spots.

The dim regions and the bright regions may be observed by naked-eyes, so that the LCD frames have a lower display quality. In addition, the phenomena of dim regions and bright regions degrade the overall uniformity of the surface light source provided by the backlight module and thereby degrade the overall optical quality of the LCD.

SUMMARY OF THE INVENTION

Accordingly, the invention is directed to an LGP (light guide plate) capable of eliminating the hot spot phenomena of a backlight module.

The invention is also directed to a backlight module capable of providing a surface light source with higher uniformity.

The other advantages of the present invention are included in the technical description exposed hereinafter.

To achieve one of, a part of or all of the above-mentioned advantages, an embodiment of the invention provides an LGP including a first surface, a second surface, a light incident surface and a plurality of optical micro-structures. The second surface is opposite to the first surface. The light incident surface connects the first surface and the second surface. The optical micro-structures are disposed on the second surface and include a plurality of round protrusive points and a plurality of curved protrusions. The curved protrusions are disposed among the round protrusive points. Each of the curved protrusions has a first arc side and a second arc side opposite to the first arc side, wherein an indentation of the first arc side and an indentation of the second arc side are substantially towards a same direction.

Another embodiment of the invention provides a backlight module including the above-mentioned LGP and a plurality of light-emitting devices. The light-emitting devices are disposed beside the light incident surface for emitting light towards the light incident surface.

In an embodiment of the invention, the optical micro-structures are disposed on the first surface and the second surface.

Based on the above description, the LGP in the embodiments of the invention adopts curved protrusions each with two arc sides, wherein the curved protrusions are able to effectively scatter the light beams for reducing the hot spot phenomena of the backlight module. In this way, the backlight module employing the LGP may provide a surface light source with higher uniformity.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Referring to FIGS. 1A-1D, a backlight module 100 in this embodiment includes an LGP 200 and a plurality of light-emitting devices 110. The LGP 200 has a first surface 210, a second surface 220 and a light incident surface 230. The second surface 220 is opposite to the first surface 210, and the light incident surface 230 connects the first surface 210 and the second surface 220. The light-emitting devices 110 are disposed beside the light incident surface 230 for emitting light towards the light incident surface 230. The light-emitting device 110 is, for example, light emitting diode (LED), and capable of emitting a light beam 112. The light beam 112 enters the LGP 200 through the light incident surface 230 and is then transmitted out of the LGP 200 through the first surface 210 so as to produce a surface light source. In this embodiment, a reflective sheet 120 is employed and disposed beside the second surface 220 for reflecting the light beam 112 from the light incident surface 230 onto the first surface 210.

The LGP 200 further includes a plurality of optical micro-structures 240 disposed on the second surface 220. The optical micro-structures 240 include a plurality of round protrusive points 250 and a plurality of curved protrusions 260, both of the round protrusive points 250 and the curved protrusions 260 may be formed on the LGP 200 by using etching, laser etching, inject molding with sandblasted mold, cutting with cutter, ultra-precision machining, photomask process or other processes. In addition, the curved protrusions 260 are disposed among the round protrusive points 250 as shown by an enlarged diagram of a region M1 in FIG. 1B. In an embodiment, each of the curved protrusions 260 is disposed at the geometry center of the round protrusive points 250 around the curved protrusion 260. In the embodiment of the invention, the round shape of a round protrusive point is not limited to right circle, but may be a circle-like shape, a circle with, for example, a serrated micro-structure or an irregular micro-structure and an ellipse-like quasi circle. Each of the curved protrusions 260 has a first arc side 262 and a second arc side 264 opposite to the first arc side 262, wherein an indentation N1 of the first arc side 262 and an indentation N2 of the second arc side 264 are substantially towards a same direction.

In this embodiment of the invention, both the indentation N1 of the first arc side 262 and the indentation N2 of the second arc side 264 are towards the light incident surface 230. Besides in this embodiment, each of the curved protrusions 260 further has a first arc end-side 266 and a second arc end-side 268, wherein the first arc end-side 266 connects the first arc side 262 and the second arc side 264 and an indentation N3 of the first arc end-side 266 is towards the curved protrusion 260. The second arc end-side 268 connects the first arc side 262 and the second arc side 264 and opposite to the first arc end-side 266. An indentation N4 of the second arc end-side 268 is towards the curved protrusion 260, and the first arc side 262, the second arc side 264, the first arc end-side 266 and the second arc end-side 268 together encircle the curved protrusion 260. The curved protrusion 260 has a convex surface 261, and the convex surface 261 is protruded towards a direction away from the LGP 200. In this embodiment, the sectional profile of the convex surface 261 (as shown in FIG. 1D) is, for example, a parabola, a circle, an ellipse or other curves. However, in other embodiments, the sectional profile of the convex surface 261 is a parabola, a circle, an ellipse or other curves, all of which are respectively formed by a curve with a serrated micro-structure or an irregular micro-structure. In this embodiment, the sectional profile of the convex surface 261 is a smooth curve (as shown in FIG. 1D), but in other embodiments, as shown in FIG. 1E, the convex surface 261' of the curved protrusion 260' is a quasi circle with rough surface, or as shown in FIG. 1F, the convex surface 261" of the curved protrusion 260" may be a circle with a top of irregular curve. The curved protrusion may be also a triangle, a quadrangle or a polygon.

It should be noted that an arc defined by the embodiment of the invention is not limited to the arc of a circle, but may be other curves with an average curvature greater than 0 and bent towards a same direction.

Figure 1A:
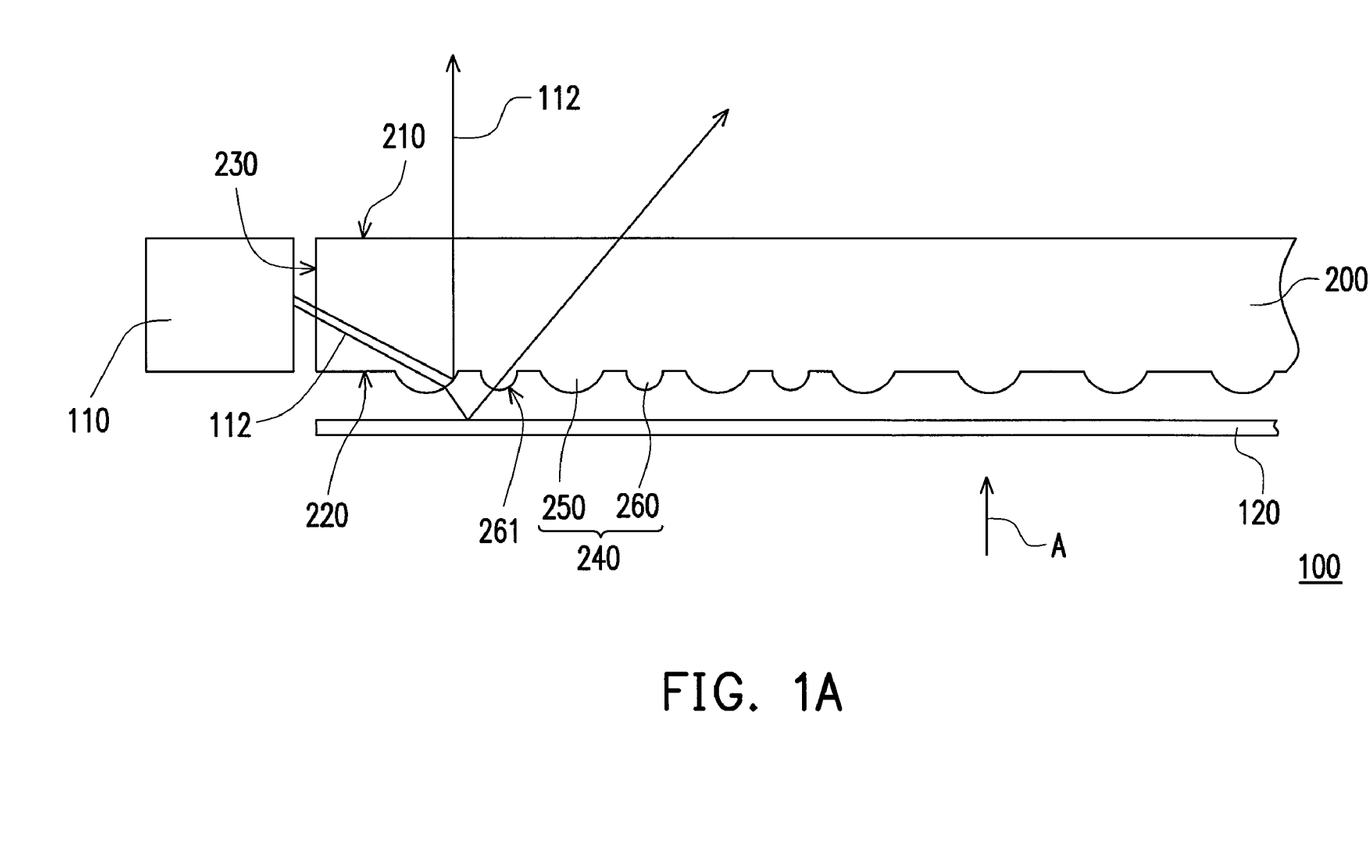
FIG. 1A is a sectional diagram of a backlight module according to an embodiment of the invention.
Figure 1B:
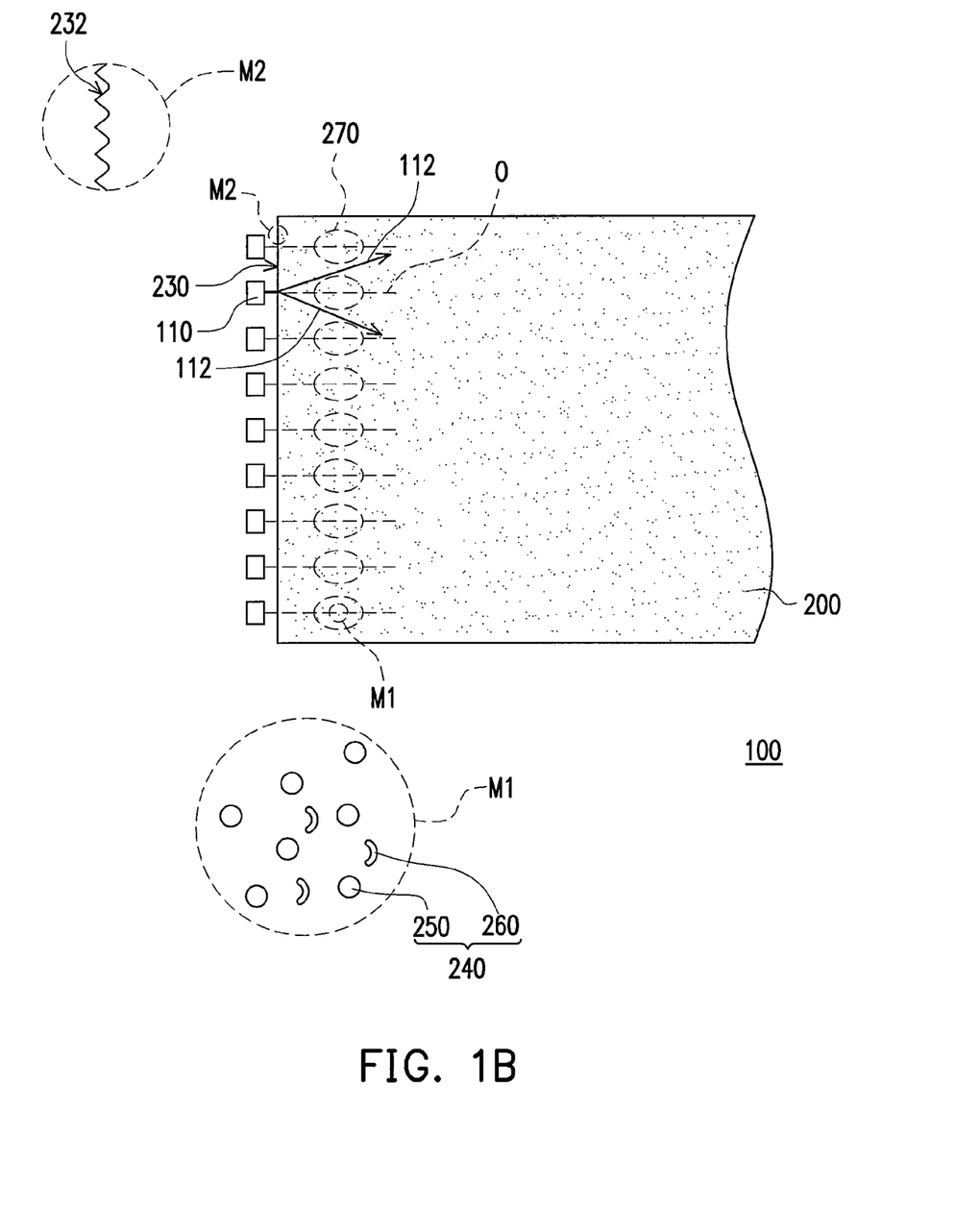
FIG. 1B is a bottom-view diagram (in the direction A) of the backlight module of, FIG. 1A, wherein the reflective sheet thereof is removed.

In this embodiment of the invention, a plurality of optical micro-structures 232 are disposed on the light incident surface 230 of the LGP 200, and the optical micro-structures 232 are, for example, serrated structures as shown by an enlarged diagram of the region M2 in FIG. 1B. In other embodiments, the optical micro-structures 232 may be intermittent serrated structures. The optical micro-structures 232 are able to make the incident light beam 112 through the light incident surface 230 divergent towards both sides of the optical axis O of each of the light-emitting devices 110, so that the luminous flux density at the area of the LGP 200 close to the light incident surface 230 and beside the optical axis O is lower than the luminous flux density at the rest area of the LGP 200. In order to avoid forming dim regions caused by the areas with lower luminous flux density on the surface light source, this embodiment deploys a plurality of luminance-enhancing-by-scattering regions 270 on the LGP 200, and the luminance-enhancing-by-scattering regions 270 are dispersively distributed within the edge area of the LGP 200 adjacent to the light incident surface 230. The luminance-enhancing-by-scattering regions 270 are arranged along a direction substantially parallel to the light incident surface 230. In this embodiment, the luminance-enhancing-by-scattering regions 270 are disposed within the area with lower luminous flux density; that is, the luminance-enhancing-by-scattering regions 270 are respectively disposed beside the optical axis O of each of the light-emitting devices 110 and each of the curved protrusions 260 is disposed in the luminance-enhancing-by-scattering region 270.

The curved protrusions 260 may alter the travelling path of the light beam 112 after being reflected by the reflective sheet 120 to enhance the light intensity of the light beam 112 emitted from the first surface 210 within the luminance-enhancing-by-scattering region 270. In this way, the luminance of the surface light source within the luminance-enhancing-by-scattering region 270 is increased to eliminate dim regions, reduce hot spot phenomena and promote the overall uniformity of the surface light source provided by the backlight module 100. In order to further promote the overall uniformity of the surface light source, in an embodiment, the number density of the curved protrusions 260 is gradually descended towards the direction away from the light incident surface 230.

It should be noted that the embodiments of the invention does not limit the optical micro-structures 240 to be disposed on the second surface 220 of the LGP 200. In fact, in other embodiments, the optical micro-structures 240 may be disposed on the first surface 210 of the LGP 200 or both on the first surface 210 and the second surface 220 of the LGP 200.

Figure 2:
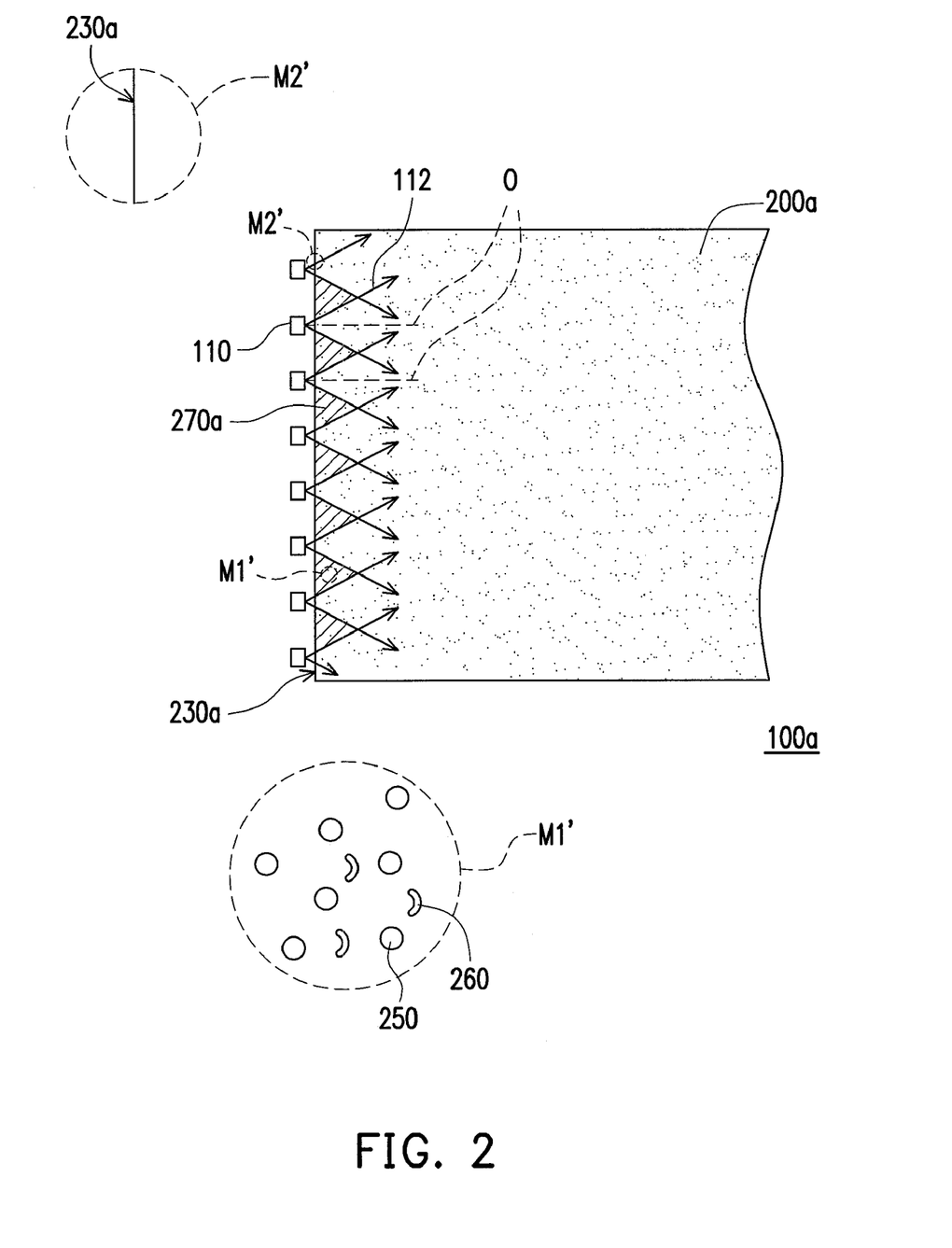
FIG. 2 is a bottom-view diagram of a backlight module according to an embodiment of the invention, wherein the reflective sheet thereof is removed.

Referring to FIG. 2, the backlight module 100a of the embodiment is similar to the backlight module 100 (as shown in FIG. 1B), and the differences between the backlight module 100 and the backlight module 100a are as follows. In the backlight module 100a of this embodiment, the light incident surface 230a of the LGP 200a is a smooth surface. As shown by the enlarged diagram of the region M2' in FIG. 2, the light beam 112 emitted from the light-emitting devices 110, after entering the LGP 200a through the light incident surface 230, has higher luminous flux density at the areas close to the optical axis O and has lower luminous flux density at the areas far away from the optical axis O. In other words, the areas of the LGP 200a close to the light incident surface 230 and between two adjacent optical axes O have lower luminous flux density. To avoid forming dim regions at the areas with lower luminous flux density, the embodiment makes the luminance-enhancing-by-scattering regions 270a disposed within the areas with lower luminous flux density, and the curved protrusions 260 are disposed on the luminance-enhancing-by-scattering regions 270.

The curved protrusions 260 on the luminance-enhancing-by-scattering regions 270 may eliminate the dim regions of the backlight module 100a so as to reduce the hot spot phenomena and enable the backlight module 100a to provide a more uniform surface light source.

Figure 1C:
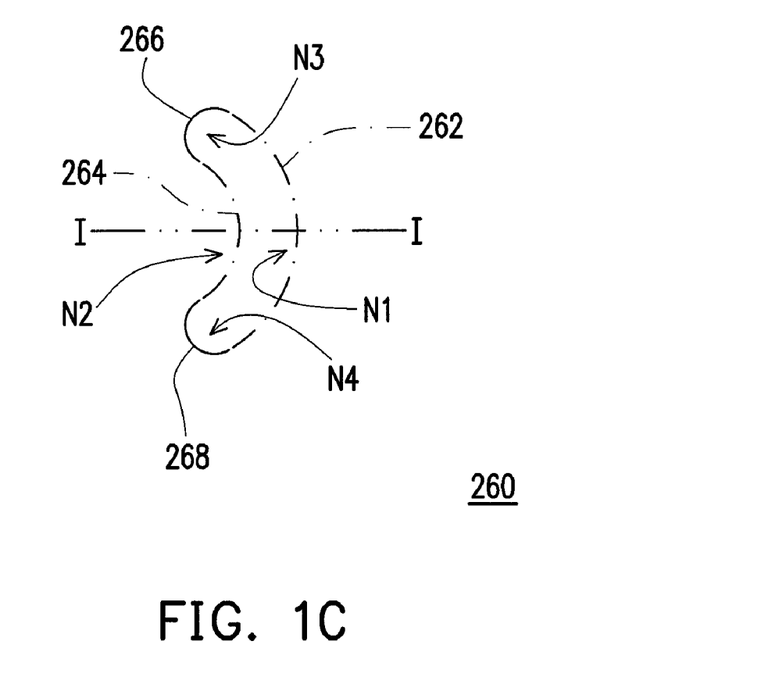
FIG. 1C is an enlarged diagram of a curved protrusion in FIG. 1B.
Figure 1D:
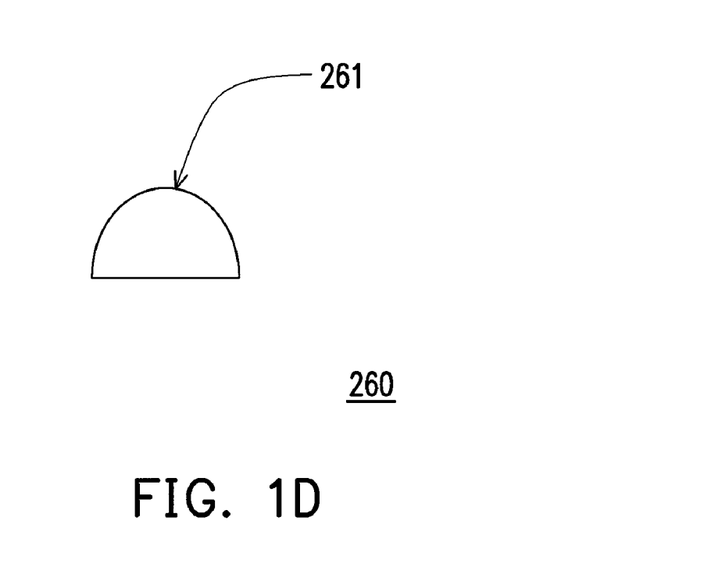
FIG. 1D is a sectional diagram of the curved protrusion of FIG. 1C along line I-I.
Figure 1E:
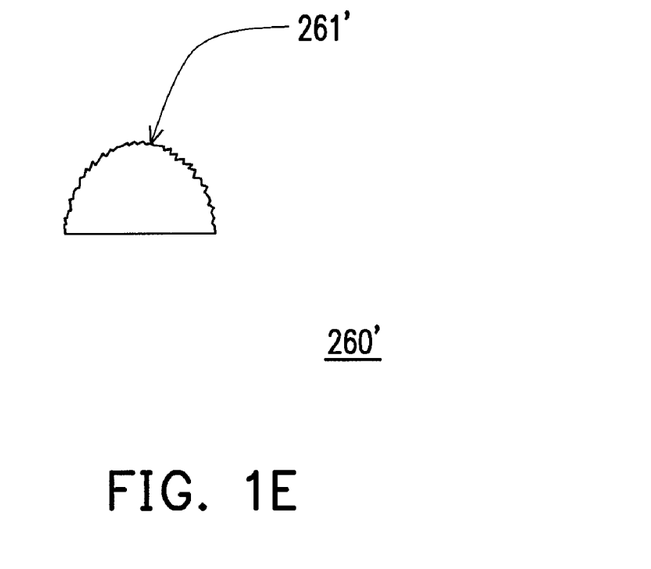
FIGS. 1E and 1F are sectional diagrams of curved protrusions according to other two embodiments of the invention.
Figure 1F:
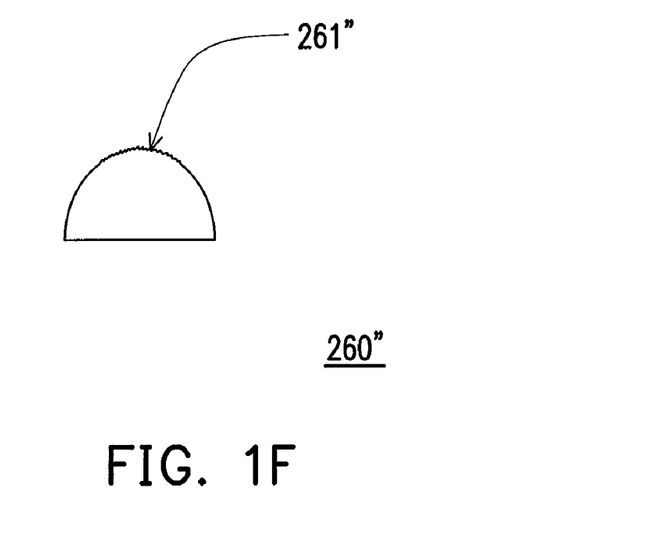
Figure 3A:
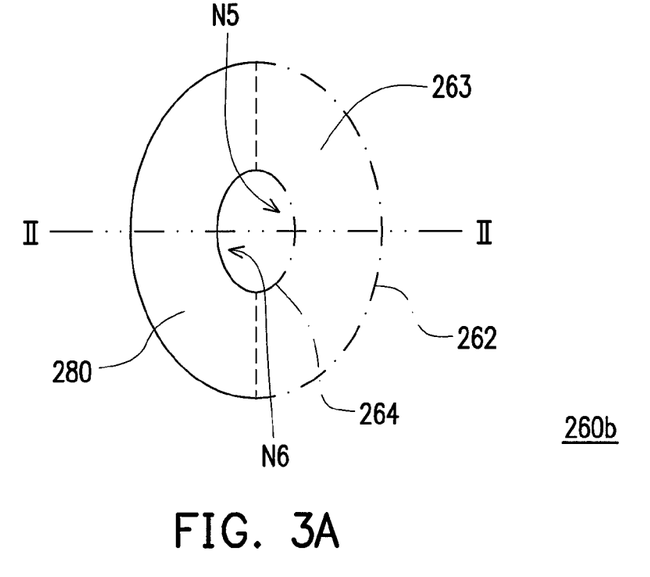
FIG. 3A is an enlarged diagram of a curved protrusion in a backlight module according to an embodiment of the invention.
Figure 3B:
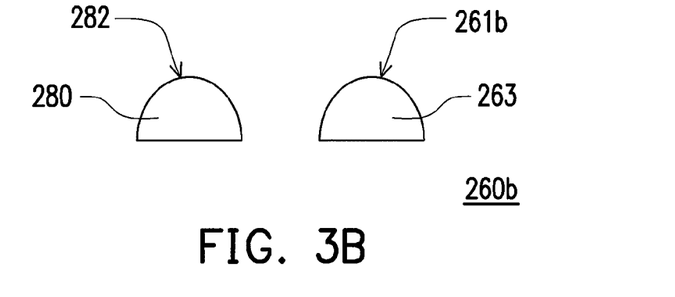
FIG. 3B is a sectional diagram of the curved protrusion of FIG. 3A along line II-II.

Referring to FIGS. 3A and 3B, the curved protrusions 260b of this embodiment are partially similar to the curved protrusions 260 (as shown in FIGS. 1C and 1D), and the differences between the curved protrusions 260b and the curved protrusions 260 are as follows. Each of the curved protrusions 260b of this embodiment includes a first arc protrusion portion 263, wherein two opposite sides of the first arc protrusion portion 263 are respectively the first arc side 262 and the second arc side 264. In addition, each of the curved protrusions 260b further includes a second arc protrusion portion 280 connected to the first arc protrusion portion 263. In more details, two opposite ends of the first arc protrusion portion 263 are respectively connected to two opposite ends of the second arc protrusion portion 280. Besides, an indentation N5 of the first arc protrusion portion 263 is towards the second arc protrusion portion 280 and an indentation N6 of the second arc protrusion portion 280 is towards the first arc protrusion portion 263.

In this embodiment of the invention, the curved protrusions 260b are disposed along a direction to make the indentations N5 oriented towards the light incident surface of the LGP. However, in other embodiments, the curved protrusions 260b are disposed along a direction to make the indentations N6 oriented towards the light incident surface of the LGP or to make both the indentations N5 and N6 oriented towards a direction substantially parallel to the light incident surface of the LGP. Furthermore, the first arc protrusion portion 263 may have a convex surface 261b, and the convex surface 261b is protruded away from the LGP. In this embodiment, the sectional profile of the convex surface 261b (as shown in FIG. 3B) is, for example, a parabola, a circle, an ellipse or other curves, but in other embodiments, the sectional profile of the convex surface 261b may be a parabola, a circle, an ellipse or other curves all of which are formed by a curve with a serrated micro-structure or an irregular micro-structure. In an embodiment, the sectional profile of the convex surface 261b is a smooth curve, a quasi circle with rough surface, or a triangle, a quadrangle or a polygon, or a circle with a top of irregular curve. The second arc protrusion portion 280 has a convex surface 282 (as shown in FIG. 3B), and the convex surface 282 is protruded away from the LGP. In this embodiment, the sectional profile of the convex surface 282 is similar to that of the convex surface 261b.

Figure 4:
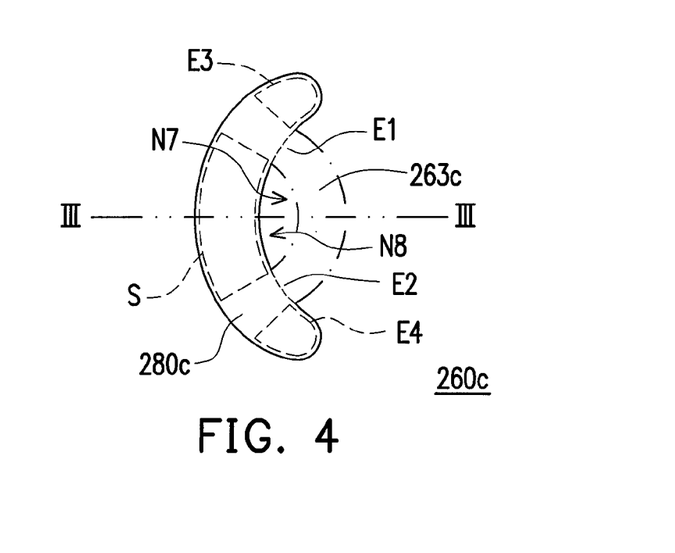
FIG. 4 is an enlarged diagram of a curved protrusion in a backlight module according to an embodiment of the invention.

Referring to FIG. 4, the curved protrusions 260c in this embodiment are similar to the above-mentioned curved protrusions 260b (as shown in FIG. 3A), and the differences between the curved protrusions 260c and the curved protrusions 260b are as follows. In the curved protrusion 260c of this embodiment, the first arc protrusion portion 263c has a first end E1 and a second end E2 opposite to the first end E1, and the second arc protrusion portion 280c has a third end E3, a fourth end E4 opposite to the third end E3 and a middle segment S between the third end E3 and the fourth end E4. The first end E1 of the first arc protrusion portion 263c is connected to a position of the second arc protrusion portion 280c between the third end E3 and the middle segment S, and the second end E2 of the first arc protrusion portion 263c is connected to a position of the second arc protrusion portion 280c between the fourth end E4 and the middle segment S. In addition, the disposition direction of the curved protrusion 260c makes an indentation N7 of first arc protrusion portion 263c towards the light incident surface of the LGP or makes an indentation N8 of second arc protrusion portion 280c towards the light incident surface of the LGP.

Figure 5A:
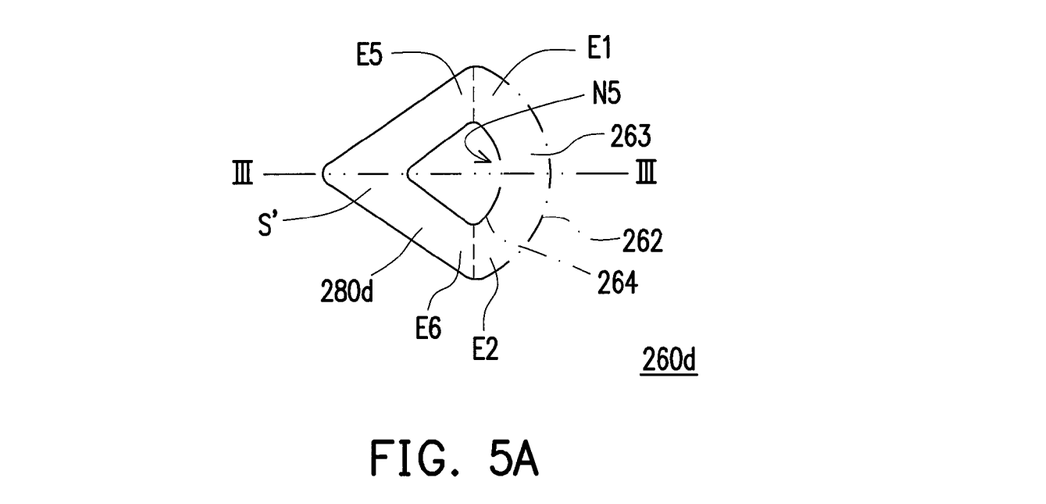
FIG. 5A is an enlarged diagram of a curved protrusion in a backlight module according to an embodiment of the invention.
Figure 5B:
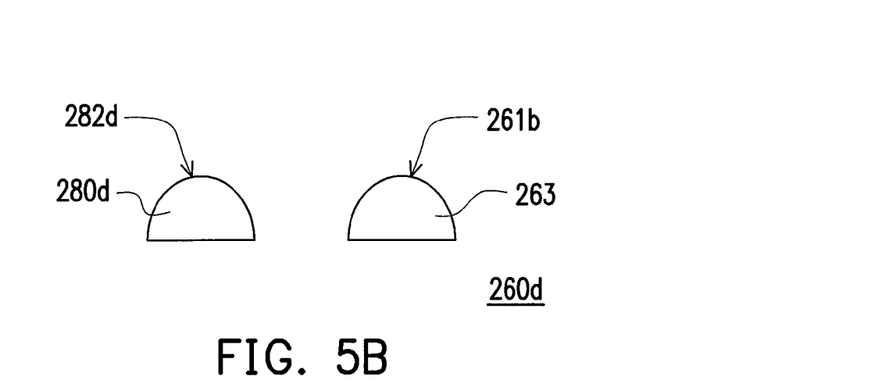
FIG. 5B is a sectional diagram of the curved protrusion of FIG. 5A along line III-III.

Referring to FIGS. 5A and 5B, the curved protrusions 260d in this embodiment are similar to the above-mentioned curved protrusions 260b (as shown in FIG. 3A), and the differences between the curved protrusions 260d and the curved protrusions 260b are as follows. The curved protrusion 260d of this embodiment further includes a V-shaped protrusion portion 280d having a fifth end E5, a sixth end E6 opposite to the fifth end E5 and a bending segment S' connecting the fifth end E5 and the sixth end E6. In this embodiment, the first arc protrusion portion 263 has a first end E1 and a second end E2 opposite to the first end E1. The first arc side 262 connects the first end E1 and the second end E2, and the second arc side 264 connects the first end E1 and the second end E2. In addition, the first end E1 and the second end E2 of the first arc protrusion portion 263 are respectively connected to the fifth end E5 and the sixth end E6 of the V-shaped protrusion portion 280d.

Moreover, the disposition direction of the curved protrusions 260d may make the indentations N5 of the first arc protrusion portions 263 towards or away from the light incident surface. The V-shaped protrusion portion 280d may have a convex surface 282d with a shape similar to the convex surface 261b.

Figure 6:
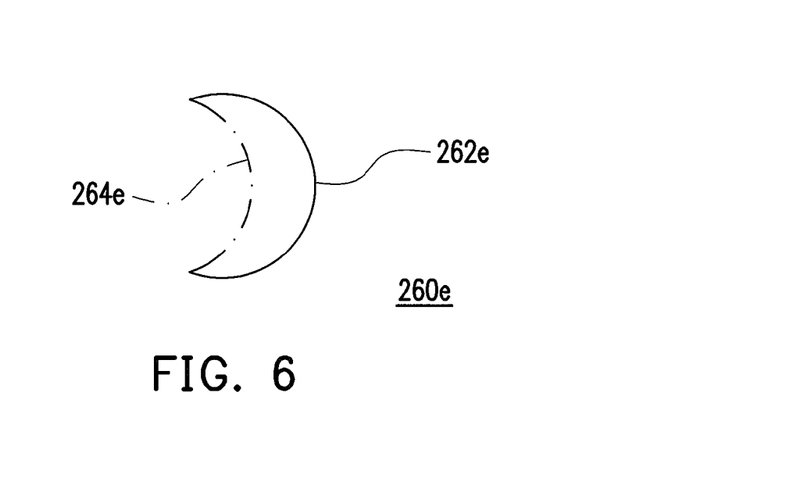
FIG. 6 is an enlarged diagram of a curved protrusion in a backlight module according to an embodiment of the invention.

Referring to FIG. 6, the curved protrusions 260e of this embodiment are similar to the above-mentioned curved protrusions 260 (as shown in FIG. 1C), and the differences between the curved protrusions 260e and the curved protrusions 260b are as follows. The curved protrusion 260e of this embodiment does not have the first arc end-side 266 and the second arc end-side 268 of the above-mentioned curved protrusion 260 (as shown in FIG. 1C), but both ends of the first arc side 262e are respectively directly connected to both ends of the second arc side 264e in the curved protrusion 260e.

Figure 7A:
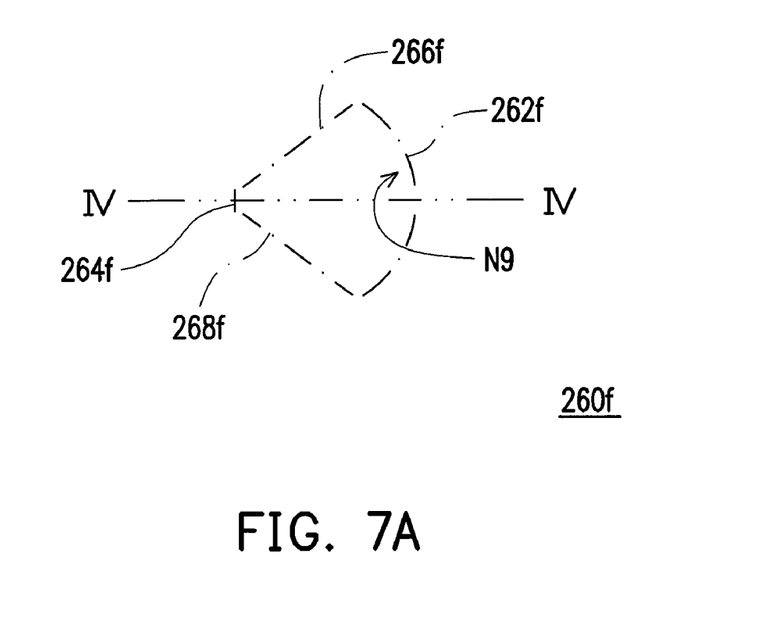
FIG. 7A is an enlarged diagram of a curved protrusion in a backlight module according to an embodiment of the invention.
Figure 7B:
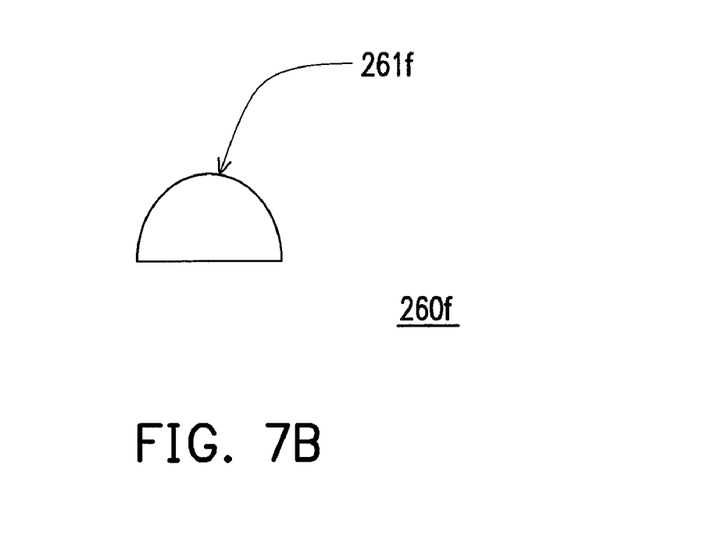
FIG. 7B is a sectional diagram of the curved protrusion of FIG. 7A along line IV-IV.

Referring to FIGS. 7A and 7B, the LGP of the backlight module of the embodiment is similar to the above-mentioned LGP 200 of the backlight module 100 (referring to FIG. 1B) except that in this embodiment, the curved protrusions 260f, instead of the curved protrusions 260 on the above-mentioned LGP 200, are disposed on the LGP. Each of the curved protrusions 260f in this embodiment has a first arc side 262f and a second arc side 264f opposite to the first arc side 262f. The curved protrusion 260f further has a first straight end-side 266f and a second straight end-side 268f, wherein the first straight end-side 266f connects the first arc side 262f and the second arc side 264f. The second straight end-side 268f connects the first arc side 262f and the second arc side 264f and opposite to the first straight end-side 266f. The first arc side 262f, the second arc side 264f, the first straight end-side 266f and the second straight end-side 268f together encircle the curved protrusion 260f to form a sector-like shape. In addition, in this embodiment, an indentation N9 of the first arc side 262f is towards the light incident surface of the LGP.

Moreover, the curved protrusion 260f has a convex surface 261f protruded away from the LGP. In this embodiment, the sectional profile of the convex surface 261f (as shown in FIG. 7B) is, for example, a parabola, a circle, an ellipse or other curves, but in other embodiments, the sectional profile of the convex surface 261f is a parabola, a circle, an ellipse or other curves all of which are formed by a curve with a serrated micro-structure or an irregular micro-structure. In an embodiment, the sectional profile of the convex surface 261f is a smooth curve, a quasi circle with rough surface, or a triangle, a quadrangle or a polygon, or a circle with a top of irregular curve.

In summary, the LGP according to the embodiments of the invention adopts curved protrusions, each of the curved protrusions has two arc sides. The curved protrusions are able to alter the optical path of the incident light beam through the light incident surface of the LGP and effectively scatter the light to eliminate the dim regions of the LGP and reduce the hot spot phenomena of the backlight module. In this way, the backlight module employing the LGP may provide a surface light source with higher uniformity.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light guide plate, comprising:
a first surface;
a second surface, opposite to the first surface;
a light incident surface, connecting the first surface and the second surface; and
a plurality of optical micro-structures, disposed on the second surface, wherein the optical micro-structures comprise:
a plurality of round protrusive points; and
a plurality of curved protrusions, disposed among the round protrusive points, wherein each of the curved protrusions has a first arc side and a second arc side opposite to the first arc side, and an indentation of the first arc side and an indentation of the second arc side are substantially towards a same direction.

2. The light guide plate as claimed in claim 1, wherein the indentation of the first arc side and the indentation of the second arc side are towards the light incident surface.

3. The light guide plate as claimed in claim 1, further comprising a plurality of luminance-enhancing-by-scattering regions dispersively distributed within an edge area of the light guide plate adjacent to the light incident surface, wherein the luminance-enhancing-by-scattering regions are arranged along a direction substantially parallel to the light incident surface, and the curved protrusions are disposed within the luminance-enhancing-by-scattering regions.

4. The light guide plate as claimed in claim 1, wherein the curved protrusion further has:
a first arc end-side, connecting the first arc side and the second arc side, wherein an indentation of the first arc end-side is towards the curved protrusion; and a second arc end-side, connecting the first arc side and the second arc side and opposite to the first arc end-side, wherein an indentation of the second arc end-side is towards the curved protrusion, and the first arc side, the second arc side, the first arc end-side and the second arc end-side together encircle the curved protrusion.

5. The light guide plate as claimed in claim 1, wherein the curved protrusion further comprises a first arc protrusion portion, two opposite sides of the first arc protrusion portion are respectively the first arc side and the second arc side, the curved protrusion further comprises a second arc protrusion portion connected to the first arc protrusion portion, an indentation of the first arc protrusion portion is towards the second arc protrusion portion, and an indentation of the second arc protrusion portion is towards the first arc protrusion portion.

6. The light guide plate as claimed in claim 5, wherein two opposite ends of the first arc protrusion portion are respectively connected to two opposite ends of the second arc protrusion portion.

7. The light guide plate as claimed in claim 5, wherein the first arc protrusion portion further has a first end and a second end opposite to the first end, the second arc protrusion portion has a third end, a fourth end opposite to the third end and a middle segment between the third end and the fourth end, the first end of the first arc protrusion portion is connected to a position of the second arc protrusion portion disposed between the third end and the middle segment, and the second end of the first arc protrusion portion is connected to a position of the second arc protrusion portion disposed between the fourth end and the middle segment.

8. The light guide plate as claimed in claim 1, wherein the curved protrusion further comprises a first arc protrusion portion, two opposite sides of the first arc protrusion portion are respectively the first arc side and the second arc side, the first arc protrusion portion has a first end and a second end opposite to the first end, the first arc side connects the first end and the second end, the second arc side connects the first end and the second end, the curved protrusion further comprises a V-shaped protrusion portion having a fifth end, a sixth end opposite to the fifth end and a bending segment connecting the fifth end and the sixth end, and the first end and the second end of the first arc protrusion portion are respectively connected to the fifth end and the sixth end of the V-shaped protrusion portion.

9. The light guide plate as claimed in claim 1, wherein the curved protrusion further comprises:
a first straight end-side, connecting the first arc side and the second arc side; and
a second straight end-side, connecting the first arc side and the second arc side and opposite to the first straight end-side, wherein the first arc side, the second arc side, the first straight end-side and the second straight end-side together encircle the curved protrusion to form a profile roughly similar to a sector.

10. The light guide plate as claimed in claim 1, wherein each of the curved protrusions is disposed at a geometry center of the round protrusive points encircling the curved protrusion.

11. A backlight module, comprising:
a light guide plate, comprising:
a first surface;
a second surface, opposite to the first surface;
a light incident surface, connecting the first surface and the second surface; and
a plurality of optical micro-structures, disposed on the second surface, wherein the optical micro-structures comprise:
a plurality of round protrusive points; and
a plurality of curved protrusions, disposed among the round protrusive points, wherein each of the curved protrusions has a first arc side and a second arc side opposite to the first arc side, and an indentation of the first arc side and an indentation of the second arc side are substantially towards a same direction; and
a plurality of light-emitting devices, disposed beside the light incident surface for emitting light towards the light incident surface.

12. The backlight module as claimed in claim 11, wherein the indentation of the first arc side and the indentation of the second arc side are towards the light incident surface.

13. The backlight module as claimed in claim 11, wherein the light guide plate further comprises a plurality of luminance-enhancing-by-scattering regions dispersively distributed within an edge area of the light guide plate adjacent to the light incident surface, wherein the luminance-enhancing-by-scattering regions are arranged along a direction substantially parallel to the light incident surface, and the curved protrusions are disposed within the luminance-enhancing-by-scattering regions.

14. The backlight module as claimed in claim 13, wherein the luminance-enhancing-by-scattering regions are disposed adjacent to optical axes of the light-emitting devices respectively.

15. The backlight module as claimed in claim 11, wherein the curved protrusion further has:
a first arc end-side, connecting the first arc side and the second arc side, wherein an indentation of the first arc end-side is towards the curved protrusion; and
a second arc end-side connecting the first arc side and the second arc side and opposite to the first arc end-side, wherein an indentation of the second arc end-side is towards the curved protrusion, and the first arc side, the second arc side, the first arc end-side and the second arc end-side together encircle the curved protrusion.

16. The backlight module as claimed in claim 11, wherein the curved protrusion further comprises a first arc protrusion portion, two opposite sides of the first arc protrusion portion are respectively the first arc side and the second arc side, the curved protrusion further comprises a second arc protrusion portion connected to the first arc protrusion portion, an indentation of the first arc protrusion portion is towards the second arc protrusion portion, and an indentation of the second arc protrusion portion is towards the first arc protrusion portion.

17. The backlight module as claimed in claim 16, wherein two opposite ends of the first arc protrusion portion are respectively connected to two opposite ends of the second arc protrusion portion.

18. The backlight module as claimed in claim 11, wherein the first arc protrusion portion further has a first end and a second end opposite to the first end, the second arc protrusion portion has a third end, a fourth end opposite to the third end and a middle segment between the third end and the fourth end, the first end of the first arc protrusion portion is connected to a position of the second arc protrusion portion disposed between the third end and the middle segment, and the second end of the first arc protrusion portion is connected to a position of the second arc protrusion portion disposed between the fourth end and the middle segment.

19. The backlight module as claimed in claim 11, wherein the curved protrusion further comprises a first arc protrusion portion, two opposite sides of the first arc protrusion portion are respectively the first arc side and the second arc side, the first arc protrusion portion has a first end and a second end opposite to the first end, the first arc side connects the first end and the second end, the second arc side connects the first end and the second end, the curved protrusion further comprises a V-shaped protrusion portion having a fifth end, a sixth end opposite to the fifth end and a bending segment connecting the fifth end and the sixth end, and the first end and the second end of the first arc protrusion portion are respectively connected to the fifth end and the sixth end of the V-shaped protrusion portion.

20. A light guide plate, comprising:

a first surface;

a second surface, opposite to the first surface;

a light incident surface, connecting the first surface and the second surface; and a plurality of optical micro-structures, disposed on the first surface and the second surface, wherein the optical micro-structures comprise:

a plurality of round protrusive points; and a plurality of curved protrusions, disposed among the round protrusive points, wherein each of the curved protrusions has a first arc side and a second arc side opposite to the first arc side, and an indentation of the first arc side and an indentation of the second arc side are substantially towards a same direction.

* * * * *